United States Patent

Valcho et al.

[11] Patent Number: 6,107,257
[45] Date of Patent: Aug. 22, 2000

[54] HIGHLY GRAFTED, MULTI-FUNCTIONAL OLEFIN COPOLYMER VI MODIFIERS

[75] Inventors: Joseph J. Valcho, Richmond, Va.; Mark Rees, Reading; Peter Growcott, Winnersh, both of United Kingdom; Mark Thomas Devlin, Richmond, Va.; Errol J. Olivier, Baton Rouge, La.

[73] Assignee: Ethyl Corporation, Richmond, Va.

[21] Appl. No.: 08/987,596

[22] Filed: Dec. 9, 1997

[51] Int. Cl.[7] ............................ C10M 145/00; C10M 149/00
[52] U.S. Cl. ...................... 508/221; 508/231; 508/454; 525/326.1; 525/375; 525/293
[58] Field of Search ............................ 508/221, 452, 508/454, 455, 231; 525/293, 326.1, 375

[56] References Cited

U.S. PATENT DOCUMENTS

| | | |
|---|---|---|
| 4,089,794 | 5/1978 | Engel et al. . |
| 4,137,185 | 1/1979 | Gardiner et al. . |
| 4,144,181 | 3/1979 | Elliott et al. . |
| 4,146,489 | 3/1979 | Stambaugh et al. . |
| 4,320,019 | 3/1982 | Hayashi . |
| 4,340,689 | 7/1982 | Joffrion . |
| 4,357,250 | 11/1982 | Hayashi . |
| 4,382,007 | 5/1983 | Chafetz et al. . |
| 4,505,834 | 3/1985 | Papay et al. . |
| 4,863,623 | 9/1989 | Nalesnik . |
| 5,055,213 | 10/1991 | Germanaud et al. ................. 252/51.5 |
| 5,075,383 | 12/1991 | Migdal et al. . |
| 5,162,086 | 11/1992 | Migdal et al. ......................... 252/47.5 |
| 5,188,745 | 2/1993 | Migdal et al. ............................ 252/47 |
| 5,427,702 | 6/1995 | Chung et al. .......................... 508/454 |
| 5,540,851 | 7/1996 | Lange ..................................... 508/454 |
| 5,556,923 | 9/1996 | Caines et al. . |
| 5,744,429 | 4/1998 | Chung et al. .......................... 508/454 |

FOREIGN PATENT DOCUMENTS

| | | |
|---|---|---|
| 1-284593 | 11/1989 | Japan . |
| 2-225506 | 7/1990 | Japan . |
| 5-112791 | 5/1993 | Japan . |
| WO/94/13763 | 6/1994 | WIPO . |
| WO/96/39477 | 12/1996 | WIPO . |

*Primary Examiner*—Jacqueline V. Howard
*Attorney, Agent, or Firm*—Dennis H. Rainear; Thomas Hamilton

[57] ABSTRACT

A novel additive comprising a highly grafted, multi-functional olefin copolymer comprising a graft and amine-derivatized copolymer prepared from ethylene and at least one $C_3$ to $C_{23}$ alpha-monoolefin and, optionally, a polyene, wherein the copolymer of ethylene and at least one $C_3$ to $C_{23}$ alpha-monoolefin has grafted thereon from 0.3 to 0.75 carboxylic groups per 1000 number average molecular weight units of olefin copolymer and wherein the olefin copolymer has a number average molecular weight of between 20,000 and 150,000, and lubricating oil concentrates and compositions containing the same are provided.

12 Claims, No Drawings

HIGHLY GRAFTED, MULTI-FUNCTIONAL OLEFIN COPOLYMER VI MODIFIERS

TECHNICAL FIELD

This invention relates to a highly grafted, multi-functional lubricant additive useful as an improved viscosity index modifier when employed in a lubricating oil composition. The present invention further relates to a method of extending lubricant drain intervals and improving fuel economy and fuel economy durability.

BACKGROUND OF THE INVENTION

The art contains many disclosures on the use of polymer additives in lubricating oil compositions. Ethylene-propylene copolymers and ethylene-alpha olefin non-conjugated diene terpolymers which have been further derivatized to provide bifunctional properties in lubricating oil compositions illustrate this type of oil additive.

U.S. Pat. No. 4,089,794 discloses ethylene copolymers derived from ethylene and one or more $C_3$ to $C_{28}$ alpha olefin solution grafted with an ethylenically-unsaturated carboxylic acid material followed by a reaction with a polyfunctional material reactive with carboxyl groups, such as a polyamine, a polyol, or a hydroxyamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graph monomer of C-vinyl-pyridine or N-vinylpyrrolidone to provide a dispersant VI improver for lubricating oils.

U.S. Pat. No. 4,320,019 discloses a multipurpose lubricating additive prepared by the reaction of an interpolymer of ethylene and a $C_3$–$C_8$ alpha-monoolefin with an olefinic carboxylic acid acylating agent to form an acylating reaction intermediate which is then reacted with an amine.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with a monoaminepolyamine mixture.

U.S. Pat. No. 4,382,007 discloses a dispersant-VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxyamine and finally reacted with an alkaryl sulfonic acid.

WO 96/39477 teaches multi-grade lubricating oils comprising a low saturate basestock, less than three mass percent of an ashless dispersant and a viscosity modifier. The reference does not teach the highly grafted, multi-functional VI modifiers of the present invention.

WO 94/13763 discloses mixed ethylene alpha olefin copolymer multifunctional viscosity modifiers. The reference does not teach the highly grafted, multi-functional VI modifiers of the present invention.

U.S. Pat. No. 4,863,623 teaches multifunctional olefin copolymer VI improvers. This patent does not teach the functionality to molecular weight relationship of the highly grafted, multi-functional VI improvers of the present invention.

U.S. Pat. No. 5,075,383 discloses a process for preparing a dispersant and antioxidant olefin copolymer additives, wherein free radical grafting is accompanied by the molecular weight reduction of the copolymers due to mechanically shearing.

U.S. Pat. No. 5,556,923 discloses oil solutions of adducted derivatized EPR or EPDM. This patent does not teach the functionality to molecular weight relationship of the highly grafted, multi-functional VI improvers of the present invention.

An object of this invention is to provide a novel highly grafted, multi-functional olefin copolymer composition.

Another object of the invention is to provide a highly grafted, multi-functional lubricant additive effective for imparting viscosity index, dispersancy and antioxidant properties to a lubricating oil composition, as well as enabling extended lubricant drain intervals and improving fuel economy and fuel economy durability.

A further object is to provide a novel lubricating oil composition containing the highly grafted, multi-functional olefin copolymer additive of the invention as well as to provide concentrates of the novel additive of invention.

SUMMARY OF THE INVENTION

The novel highly grafted, multi-functional olefin copolymer of the present invention comprises the reaction product of (1) an acylated olefin copolymer, wherein the acylated copolymer comprises copolymers or terpolymers of ethylene and $C_3$ to $C_{23}$ alpha-olefin and optionally a non-conjugated diene or triene on which has been grafted ethylenically unsaturated carboxylic reactants to a level of 0.3 to 0.75 carboxylic groups per 1000 number average molecular weight units (Mn), and (2) a polyamine compound selected from the group consisting of:

(a) an N-arylphenylenediamine represented by the formula:

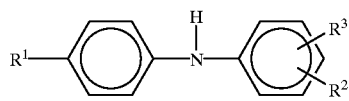

in which $R^1$ is hydrogen, —NH-aryl, —NH-arylalkyl, —NH-alkyl, or a branched or straight chain radical having from 4 to 24 carbon atoms that can be alkyl, alkenyl, alkoxyl, aralkyl, alkaryl, hydroxyalkyl or aminoalkyl; $R^2$ is —$NH_2$, $CH_2$—$(CH_2)_n$—$NH_2$, $CH_2$-aryl-$NH_2$, in which n has a value from 1 to 10; and $R^3$ is hydrogen, alkyl, alkenyl, alkoxyl, aralkyl, alkaryl having from 4 to 24 carbon atoms;

(b) an aminothiazole from the group consisting of aminothiazole, aminobenzothiazole, aminobenzothiadiazole and aminoalkylthiazole;

(c) an aminocarbazole represented by the formula:

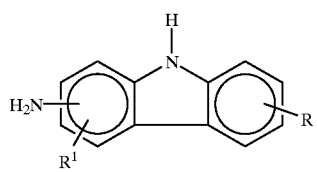

in which R and R¹ represent hydrogen or an alkyl, alkenyl or alkoxyl radical having from 1 to 14 carbon atoms;

(d) an aminoindole represented by the formula:

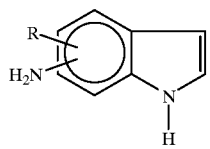

in which R represents hydrogen or an alkyl radical having from 1 to 14 carbon atoms;

(e) an aminopyrrole represented by the formula:

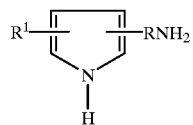

in which R is a divalent alkylene radical having 2–6 carbon atoms and R¹ is hydrogen or an alkyl radical having from 1 to 14 carbon atoms;

(f) an amino-indazolinone represented by the formula:

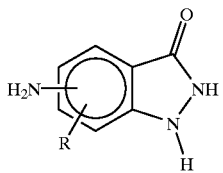

in which R is hydrogen or an alkyl radical having from 1 to 14 carbon atoms;

(g) an aminomercaptotriazole represented by the formula:

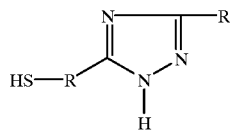

in which R can be absent or is a $C_1$–$C_{10}$ linear or branched hydrocarbon selected from the group consisting of alkyl, alkenyl, arylalkyl, or aryl;

(h) and an aminoperimidine represented by the formula,

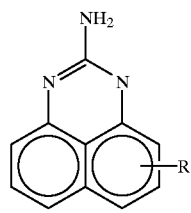

in which R represents hydrogen or an alkyl or alkoxy radical having from 1 to 14 carbon atoms;

(i) aminoalkyl imidazoles, such as 1-(2-aminoethyl) imidazole, 1-(3-aninopropyl) imidazole; and (j) aminoalkyl morpholines, such as 4-(3-aminopropyl) morpholine.

The novel lubricant compositions of the present invention comprise an oil of lubricating viscosity and an effective amount of the highly grafted, multi-functional olefin copolymer.

DETAILED DESCRIPTION OF THE INVENTION

The polymer or copolymer substrate employed in the novel, highly grafted, multi-functional olefin copolymer additive of the present invention may be prepared from ethylene and propylene or it may be prepared from ethylene and at least one higher olefin within the range of $C_3$ to $C_{23}$ alpha-olefins.

Preferred polymers for use in the present invention are copolymers of ethylene and one or more $C_3$ to $C_{23}$ alpha-olefins. Copolymers of ethylene and propylene are most preferred. Other alpha-olefins suitable in place of propylene to form the copolymer or to be used in combination with ethylene and propylene to form a terpolymer include 1-butene, 1-pentene, 1-hexene, 1-octene and styrene; α,ω-diolefins such as 1,5-hexadiene, 1,6-heptadiene, 1,7-octadiene; branched chain alpha-olefins such as 4-methylbutene-1,5-methylpentene-1 and 6-methylheptene-1; and mixtures thereof.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norborene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of the invention are 1-isopropylidene-3α,4,7,7α-tetrahydroindene, 1-isopropylidenedicyclopentadiene, dihydro-isodicyclopentadiene, and 2-(2-methylene-4-methyl-3-pentenyl)[2.2.1] bicyclo-5-heptene.

Ethylene-propylene or higher alpha-olefin copolymers may consist of from about 15 to 80 mole percent ethylene and from about 85 to 20 mole percent $C_3$ to $C_{23}$ alpha-olefin with the preferred mole ratios being from about 35 to 75 mole percent ethylene and from about 65 to 25 mole percent of a $C_3$ to $C_{23}$ alpha-olefin, with the more preferred proportions being from 50 to 70 mole percent ethylene and 50 to 30 mole percent $C_3$ to $C_{23}$ alpha-olefin, and the most preferred proportions being from 55 to 65 mole percent ethylene and 45 to 35 mole percent $C_3$ to $C_{23}$ alpha-olefin.

Terpolymer variations of the foregoing polymers may contains from about 0.1 to 10 mole percent of a non-conjugated diene or triene.

The polymer substrate, that is the ethylene copolymer or terpolymer, is an oil-soluble, linear or branched polymer having a number average molecular weight from about 20,000 to 150,000 as determined by gel permeation chromatography and universal calibration standardization, with a preferred number average molecular weight range of 30,000 to 110,000.

The terms polymer and copolymer are used generically to encompass ethylene copolymers, terpolymers or interpolymers. These materials may contain minor amounts of other olefinic monomers so long as the basic characteristics of the ethylene copolymers are not materially changed.

The polymerization reaction used to form the ethylene-olefin copolymer substrate is generally carried out in the presence of a conventional Ziegler-Natta or metallocene catalyst system. The polymerization medium is not specific and can include solution, slurry, or gas phase processes, as known to those skilled in the aft. When solution polymerization is employed, the solvent may be any suitable inert hydrocarbon solvent that is liquid under reaction conditions for polymerization of alpha-olefins; examples of satisfactory hydrocarbon solvents include straight chain paraffins having from 5 to 8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. When slurry polymerization is employed, the liquid phase for polymerization is preferably liquid propylene. It is desirable that the polymerization medium be free of substances that will interfere with the catalyst components.

An ethylenically unsaturated carboxylic acid material is next grafted onto the prescribed polymer backbone to form an acylated ethylene copolymer. These carboxylic reactants which are suitable for grafting onto the ethylene copolymer contain at least one ethylenic bond and at least one, preferably two, carboxylic acid or its anhydride groups or a polar group which is convertible into said carboxyl groups by oxidation or hydrolysis. Preferably, the carboxylic reactants are selected from the group consisting of acrylic, methacrylic, cinnamic, crotonic, maleic, fumaric and itaconic reactants. More preferably, the carboxylic reactants are selected from the group consisting of maleic acid, fumaric acid, maleic anhydride, or a mixture of two or more of these. Maleic anhydride or a derivative thereof is generally most preferred due to its commercial availability and ease of reaction. In the case of unsaturated ethylene copolymers or terpolymers, itaconic acid or its anhydride is preferred due to its reduced tendency to form a cross-linked structure during the free-radical grafting process.

The ethylenically unsaturated carboxylic acid materials typically can provide one or two carboxylic groups per mole of reactant to the grafted polymer. That is, methyl methacrylate can provide one carboxylic group per molecule to the grafted polymer while maleic anhydride can provide two carboxylic groups per molecule to the grafted polymer.

The carboxylic reactant is grafted onto the prescribed polymer backbone in an amount to provide 0.3 to 0.75 carboxylic groups per 1000 number average molecular weight units of the polymer backbone, preferably 0.3 to 0.5 carboxylic groups per 1000 number average molecular weight. For example, a copolymer substrate with Mn of 20,000 is grafted with 6 to 15 carboxylic groups per polymer chain or 3 to 7.5 moles of maleic anhydride per mole of polymer. A copolymer with Mn of 100,000 is grafted with 30 to 75 carboxylic groups per polymer chain or 15 to 37.5 moles of maleic anhydride per polymer chain. The minimum level of functionality is the level needed to achieve the minimum satisfactory dispersancy performance. Above the maximum functionality level little, if any, additional dispersancy performance is noted and other properties of the additive may be adversely affected.

The grafting reaction to form the acylated olefin copolymers is generally carried out with the aid of a free-radical initiator either in solution or in bulk, as in an extruder or intensive mixing device. When the polymerization is carried out in hexane solution, it is economically convenient to carry out the grafting reaction in hexane as described in U.S. Pat. Nos. 4,340,689, 4,670,515 and 4,948,842, incorporated herein by reference. The resulting polymer intermediate is characterized by having carboxylic acid acylating functionality randomly within its structure.

In the bulk process for forming the acylated olefin copolymers, the olefin copolymer is fed to rubber or plastic processing equipment such as an extruder, intensive mixer or masticator, heated to a temperature of 150°. to 400° C. and the ethylenically unsaturated carboxylic acid reagent and free-radical initiator are separately co-fed to the molten polymer to effect grafting. The reaction is carried out optionally with mixing conditions to effect shearing and grafting of the ethylene copolymers according to U.S. Pat. No. 5,075,383, incorporated herein by reference. The processing equipment is generally purged with nitrogen to prevent oxidation of the polymer and to aid in venting unreacted reagents and byproducts of the grafting reaction. The residence time in the processing equipment is sufficient to provide for the desired degree of acylation and to allow for purification of the acylated copolymer via venting. Mineral or synthetic lubricating oil may optionally be added to the processing equipment after the venting stage to dissolve the acylated copolymer.

The free-radical initiators which may be used to graft the ethylenically unsaturated carboxylic acid material to the polymer backbone include peroxides, hydroperoxides, peresters, and also azo compounds and preferably those which have a boiling point greater than 100° C. and decompose thermally within the grafting temperature range to provide free radicals. Representatives of these free-radical initiators are azobutyronitrile, dicumyl peroxide, 2,5-dimethylhexane-2,5-bis-tertiarybutyl peroxide and 2,5-dimnethylhex-3-yne-2,5-bis-tertiary-butyl peroxide. The initiator is used in an amount of between about 0.005% and about 1% by weight based on the weight of the reaction mixture.

Other methods known in the art for effecting reaction of ethylene-olefin copolymers with ethylenically unsaturated carboxylic reagents, such as halogenation reactions, thermal or "ene" reactions or mixtures thereof, can be used instead of the free-radical grafting process. Such reactions are conveniently carried out in mineral oil or bulk by heating the reactants at temperatures of 250° to 400° C. under an inert atmosphere to avoid the generation of free radicals and oxidation byproducts. "Ene" reactions are a preferred method of grafting when the ethylene-olefin copolymer contains unsaturation. To achieve the high graft levels, 0.3 to 0.5 carboxylic groups per 1000 Mn, desired by this invention it may be necessary to follow or proceed the "ene" or thermal graft reaction with a free radical graft reaction.

The polymer intermediate possessing carboxylic acid acylating functions is reacted with a polyamine compound selected from the group consisting of:

(a) an N-arylphenylenediamine represented by the formula:

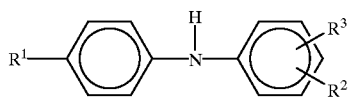

in which $R^1$ is hydrogen, —NH-aryl, —NH-arylalkyl, —NH-alkyl, or a branched or straight chain radical having from 4 to 24 carbon atoms that can be alkyl, alkenyl, alkoxyl, aralkyl, alkaryl, hydroxyalkyl or aminoalkyl; $R^2$ is —$NH_2$, $CH_2$—$(CH_2)_n$—$NH_2$, $CH_2$-aryl-$NH_2$, in which n has a value from 1 to 10; and $R^3$ is hydrogen, alkyl, alkenyl, alkoxyl, aralkyl, alkaryl having from 4 to 24 carbon atoms;

(b) an aminothiazole from the group consisting of aminothiazole, aminobenzothiazole, aminobenzothiadiazole and aminoalkylthiazole;

(c) an aminocarbazole represented by the formula:

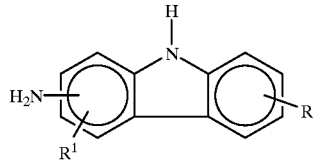

in which R and $R^1$ represent hydrogen or an alkyl, alkenyl, or alkoxy radical having from 1 to 14 carbon atoms;

(d) an aminoindole represented by the formula:

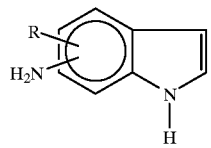

in which R represents hydrogen or an alkyl radical having from 1 to 14 carbon atoms;

(e) an aminopyrrole represented by the formula:

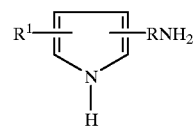

in which R is a divalent alkylene radical having 2 to 6 carbon atoms and $R^1$ is hydrogen or an alkyl radical having from 1 to 14 carbon atoms;

(f) an amino-indazolinone represented by the formula:

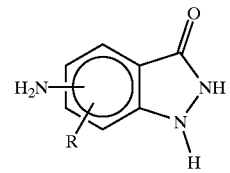

in which R is hydrogen or an alkyl radical having from 1 to 14 carbon atoms;

(g) an aminomercaptotriazole represented by the formula:

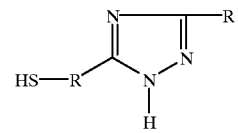

in which R can be absent or is a $C_1$–$C_{10}$ linear or branched hydrocarbon selected from the group consisting of alkyl, alkenyl, arylalkyl, or aryl;

(h) an aminoperimidine represented by the formula:

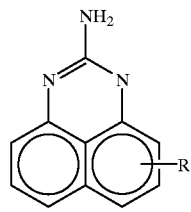

in which R represents hydrogen or an alkyl or alkoxyl radical having from 1 to 14 carbon atoms;

(i) aminoalkyl imidazoles, such as 1-(2-aminoethyl) imidazole, 1-(3-aminopropyl) imidazole; and (j) anminoalkyl morpholines, such as 4-(3-aminopropyl) morpholine.

Particularly preferred polyamimes for use in the present invention are the N-arylphenylenediamines, more specifically the N-phenylphenylenediamines, for example, N-phenyl-1,4-phenylenediamine, N-phenyl-1,3-phenylendiamine, and N-phenyl-1,2-phenylenediamine.

It is preferred that the polyamines contain only one primary amine group so as to avoid coupling and/or gelling of the olefin copolymers.

The reaction between the polymer substrate intermediate having grafted thereon carboxylic acid acylating function and the prescribed polyamine compound is preferably conducted by heating a solution of the polymer substrate under inert conditions and then adding the polyamine compound to the heated solution generally with mixing to effect the reaction. It is convenient to employ an oil solution of the polymer substrate heated to 140° to 175° C., while maintaining the solution under a nitrogen blanket. The polyamine compound is added to this solution and the reaction is effected under the noted conditions.

Typically, the polyamine compound(s) is (are) dissolved in a surfactant and added to a mineral or synthetic lubricating oil or solvent solution containing the acylated olefin copolymer. This solution is heated with agitation under an inert gas purge at a temperature in the range of 120° to 200° C. as described in U.S. Pat. No. 5,384,371, the disclosure of which is herein incorporated by reference. The reactions are carried out conveniently in a stirred reactor under nitrogen purge. However, it is also possible to add a surfactant solution of the polyamine compound to zones downstream from the graft reaction-vent zones in a twin screw extruder reactor.

Surfactants which may be used in carrying out the reaction of the acylated olefin copolymer with the polyamine(s) include but are not limited to those characterized as having (a) solubility characteristics compatible with mineral or synthetic lubricating oil, (b) boiling point and vapor pressure characteristics so as not to alter the flash point of the oil and (c) polarity suitable for solubilizing the polyamine(s). A suitable class of such surfactants includes the reaction products of aliphatic and aromatic hydroxy compounds with ethylene oxide, propylene oxide or mixtures thereof. Such surfactants are commonly known as aliphatic or phenolic alkoxylates. Representative examples are SURFONIC® N-40, N-60, L-24-5, L-46-7 (Huntsman Chemical Company), Neodol® 23-5 and 25-7 (Shell Chemical Company) and Tergitol® surfactants (Union Carbide). Preferred surfactants include those surfactants that contain a functional group, e.g., —OH, capable of reacting with the acylated olefin copolymer.

The quantity of surfactant used depends in part on its ability to solubilize the polyamine. Typically, concentrations of 5 to 40 wt. % polyamine are employed. The surfactant can also be added separately, instead of or in addition to the concentrates discussed above, such that the total amount of surfactant in the finished additive is 10 wt. % or less.

The highly grafted, multi-functional olefin copolymers of the present invention can be incorporated into a lubricating oil in any convenient way. Thus, the highly grafted, multi-functional olefin copolymers can be added directly to the lubricating oil by dispersing or dissolving the same in the lubricating oil at the desired level of concentration. Such blending into the lubricating oil can occur at room temperature or elevated temperatures. Alternatively, the highly grafted, multi-functional olefin copolymers can be blended with a suitable oil-soluble solvent/diluent (such as benzene, xylene, toluene, lubricating base oils and petroleum distillates) to form a concentrate, and then blending the concentrate with a lubricating oil to obtain the final formulation. Such additive concentrates will typically contain (on an active ingredient (A.I.) basis) from about 3 to about 45 wt. %, and preferably from about 10 to about 35 wt. %, highly grafted, multi-functional olefin copolymer additive, and typically from about 20 to 90 wt %, preferably from about 40 to 60 wt %, base oil based on the concentrate weight.

The highly grafted, multi-functional olefin copolymer products of the present invention find their primary utility in lubricating oil compositions which employ a base oil in which the additives are dissolved or dispersed. Such base oils may be natural, synthetic or mixtures thereof. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, heavy duty hydraulic fluids, power steering fluids and the like. Gear lubricants, industrial oils, pump oils and other lubricating oil compositions can also benefit from the incorporation therein of the additive mixtures of the present invention.

These lubricating oil formulations conventionally contain additional additives that will supply the characteristics that are required in the formulations. Among these types of additives are included additional viscosity index improvers, antioxidants, corrosion inhibitors, detergents, dispersants, pour point depressants, antiwear agents, antifoamants, demulsifiers and friction modifiers.

In the preparation of lubricating oil formulations it is common practice to introduce the additives in the form of 10 to 80 wt. % active ingredient concentrates in hydrocarbon oil, e.g. mineral lubricating oil, or other suitable solvent. Usually these concentrates may be diluted with 3 to 100, e.g., 5 to 40, parts by weight of lubricating oil per part by weight of the additive package in forming finished lubricants, e.g. crankcase motor oils. The purpose of concentrates, of course, is to make the handling of the various materials less difficult and awkward as well as to facilitate solution or dispersion in the final blend. Thus, the highly grafted, multi-functional olefin copolymer would usually be employed in the form of a 10 to 50 wt. % concentrate, for example, in a lubricating oil fraction.

The highly grafted, multi-functional olefin copolymers of the present invention will generally be used in admixture with a lube oil basestock, comprising an oil of lubricating viscosity, including natural lubricating oils, synthetic lubricating oils and mixtures thereof.

Natural oils include animal oils and vegetable oils (e.g., castor, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. The synthetic lubricating oils used in this invention include one of any number of commonly used synthetic hydrocarbon oils, which include, but are not limited to, poly-alpha-olefins, alkylated aromatics, alkylene oxide polymers, interpolymers, copolymers and derivatives thereof here the terminal hydroxyl groups have been modified by esterification, etherification etc, esters of dicarboxylic acids and silicon-based oils.

The present invention is further directed to a method of improving fuel economy and fuel economy durability of a vehicle wherein said method comprises adding to and operating in the crankcase of the vehicle the lubricating oil composition described above.

Also, a method of extending lubricant drain intervals in a vehicle is contemplated. Said method comprises adding to and operating in the crankcase of the vehicle the lubricating oil composition described above.

A method of improving the low temperature properties of a lubricating oil is also contemplated. Said method comprising combining an oil of lubricating viscosity and the highly grafted, multi-functional olefin copolymer described above.

The highly grafted, multi-functional olefin copolymers of the present invention may be post-treated so as to impart additional properties necessary or desired for a specific lubricant application. Post-treatment techniques are well known in the art and include boronation, phosphorylation, and maleination.

The following examples illustrate the preparation of the highly grafted, multi-functional olefin copolymers of the present invention.

EXAMPLE I (Preparation of highly grafted (0.36 carboxylic groups/1000 Mn), multi-functional viscosity modifier)

The multi-functional olefin copolymers set forth in the following examples were prepared by the same general method. An acylated ethylene-propylene copolymer was prepared by free radically grafting maleic anhydride, in the presence of a solvent, onto an ethylene-propylene copolymer backbone. The acylated ethylene-propylene copolymer had a number average molecular weight of approximately 40,000 as determined by gel permeation chromatography. The reaction conditions and molar proportions of maleic anhydride and ethylene-propylene copolymer were such that 7.2 molecules of maleic anhydride were grafted onto the olefin copolymer backbone. This is equivalent to 0.36 carboxylic groups per 1000 Mn of polymer backbone (i.e., 2×7.2=14.4 carboxylic groups/40,000 Mn=0.36 carboxylic groups/1000 Mn) to form the acylated ethylene-propylene copolymer. The acylated ethylene-propylene copolymer was reacted with N-phenyl-1,4-phenylenediamine (NPPDA), in the presence of a surfactant, at 160° C. for approximately six hours. The NPPDA was added in an amount sufficient to theoretically react with all of the grafted carboxylic groups.

EXAMPLE II (Preparation of highly grafted (0.71 carboxylic groups/1000 Mn), multi-functional viscosity modifier)

The highly grafted, multi-functional viscosity modifier of Example II was prepared in the same manner as that of Example I. However, a sufficient amount of maleic anhydride was added such that 14.2 molecules of maleic anhydride were grafted onto the olefin copolymer backbone. This is equivalent to 0.71 carboxylic groups per 1000 Mn of polymer backbone (i.e., 2×14.2=28.4 carboxylic groups/40,000 Mn=0.71 carboxylic groups/1000 Mn) to form the acylated ethylene-propylene copolymer. The acylated ethylene-propylene copolymer was reacted with N-phenyl-1,4-phenylenediamine (NPPDA), in the presence of a surfactant, at 160° C. for approximately six hours. The NPPDA was added in an amount sufficient to theoretically react with all of the grafted carboxylic groups.

COMPARATIVE EXAMPLE I (Preparation of a multi-functional viscosity modifier having 0.16 carboxylic groups/1000 Mn)

The multi-functional viscosity modifier of Comparative Example I was prepared in the same manner as that of Example I. However, a sufficient amount of maleic anhydride was added such that 3.2 molecules of maleic anhydride were grafted onto the olefin copolymer backbone. This is equivalent to 0.16 carboxylic groups per 1000 Mn of polymer backbone (i.e., 2×3.2=6.4 carboxylic groups/40,000 Mn=0.16 carboxylic groups/1000 Mn) to form the acylated ethylene-propylene copolymer. The acylated ethylene-propylene copolymer was reacted with N-phenyl-1,4-phenylenediamine (NPPDA), in the presence of a surfactant, at 160° C. for approximately six hours. The NPPDA was added in an amount sufficient to theoretically react with all of the grafted carboxylic groups.

Table 1 demonstrates the enhanced performance obtainable by using the highly grafted, multi-functional olefin copolymer of the present invention. Example A, containing the olefin copolymer of Example I, and a Comparative Example A, containing a multi-functional viscosity modifier according to WO-A-94/13763, commercially available from Exxon Chemical Company, were prepared by blending the respective viscosity modifiers into identical lubricating oil formulations containing an SAE 15W-50 motor oil having identical detergent-inhibitor packages, mineral oil basestocks and ashless dispersants. The fully formulated oils were tested in the Peugeot XUD 11ATE test and the results are given in Table 1. The Peugeot XUD 11ATE test demonstrates the effects of an additive on viscosity control in passenger car diesel engines.

TABLE 1

XUD 11ATE Test results

| Test | ACEA Quality Level | | Example A | Comparative Example A |
|---|---|---|---|---|
| | B2 | B3 | | |
| Piston Merit | 43 min | 46 min | 50.0 | 40.9 |
| Viscosity Increase % | 200 max | 125 max | 20 | 214 |
| Sludge | R&R | R&R | 9.2 | 7.6 |
| Performance Level | | | B3 | Fail |

It is clear upon examination of Table 1, that the fully formulated oils containing the viscosity index improver of the present invention (Example 1) achieves the highest performance level (i.e., B3) in the XUD 11ATE test, while the fully formulated oil containing a commercially available multi-functional viscosity modifier (Comparative Example A) fails this test. This data shows a significant and unexpected benefit from the viscosity modifiers of the present invention in viscosity control for passenger car diesel engines. This viscosity control has the following consequential benefits to the lubricant: improved pumpability, improved wear, improved fuel economy, and improvements in extended drain applications.

Table 2 demonstrates the enhanced performance obtainable by using the highly grafted, multi-functional olefin copolymer of the present invention. Example B, containing the olefin copolymer of Example I, and a Comparative Example B, containing a multi-functional viscosity modifier according to WO-A-94/13763, commercially available from Exxon Chemical Company, were prepared by blending the respective viscosity modifiers into identical lubricating oil formulations containing an SAE 10W-40 motor oil having identical detergent-inhibitor packages, mineral oil basestock and ashless dispersants. The fully formulated oils were tested in the Peugeot TU3M HTPD test and the results are given in Table 2. The Peugeot TU3M HTPD test demonstrates the effects of an additive on viscosity control and high temperature deposits in passenger car gasoline engines.

TABLE 2

TU3M HTPD results

| Test | ACEA Quality Level | | Example B | Comparative Example B |
|---|---|---|---|---|
| | A2 | A3 | | |
| Ring Sticking | >9.0 | >9.0 | 9.8 | 9.3 |

TABLE 2-continued

TU3M HTPD results

| Test | ACEA Quality Level | | Example B | Comparative Example B |
|---|---|---|---|---|
| | A2 | A3 | | |
| Rings <9.0 Sticking | 0 max | 0 max | Zero | 2 |
| Piston Varnish | >60 | >65 | 81.6 | 61.5 |
| Viscosity Increase % | <40 | <40 | 39.3 | 15.0 |
| Performance Level | | | A3 | Fail |

It is clear upon examination of Table 2, that the fully formulated oils containing the viscosity index improver of the present invention (Example 1) achieves the highest performance level (i.e., A3) in the TU3M HTPD test, while the filly formulated oil containing a commercially available multi-functional viscosity modifier (Comparative Example B) fails this test. This data shows a significant and surprising benefit from the highly grafted, multi-functional viscosity modifiers of the present invention in viscosity control and high temperature piston deposits. Good performance in this test indicates improved wear protection in long drain applications and increased extended drain capability due to less ring and liner wear, relative to a similar formulation that contains a viscosity modifier outside the scope of the present invention.

Table 3 demonstrates the results of VE sludge and varnish as well as the cold cranking simulator (CCS). The highly grafted, multi-functional viscosity modifier of Example I and a comparative viscosity modifier were each added to identical lubricating oil formulations containing an SAE 10W-30 mineral oil basestock having the same detergent-inhibitor package. Four percent by weight of a commercially available Mannich dispersant was added to the Comparative oil, while only two percent of the Mannich dispersant was added to the oil of Example C, containing the viscosity modifier as prepared in Example I. The comparative viscosity modifier present in Comparative Example C was prepared as described in Comparative Example I above so as to provide 0.16 carboxylic groups, i.e., 0.08 maleic anhydride molecules, per 1000 Mn of copolymer substrate. Comparative example C contained 0.84% copolymer substrate from the comparative viscosity modifier while Example C, containing a viscosity modifier of the present invention, contained 0.91% copolymer substrate from the viscosity modifier of Example I. The reduction in low temperature viscosity, as indicated by the Cold Cranking Simulator test, is a direct result of the major reduction in dispersant level (2 vs. 4%) allowed by the exceptional dispersant performance of the highly grafted, multi-functional viscosity modifier of Example I.

TABLE 3

| | Example C | Comparative Example C |
|---|---|---|
| CCS-20° C. | 3020 | 3300 |
| Ave. sludge (9.0 min) | 9.23 | 9.32 |
| Ave. varnish (5.0 min) | 6.31 | 6.07 |

It is clear upon examination of the above data, that the compositions containing the viscosity modifier of the present invention exhibits VE sludge and varnish ratings comparable to the compositions containing a viscosity modifier outside of the scope of the present invention even though the oil containing the viscosity modifier of the present invention contained only half the amount of Mannich dispersant as Comparative Example C with the viscosity modifier of Comparative Example I. Further, it is clear that the oil containing the viscosity modifier of the present invention exhibits improved (i.e., lower) CCS than a similar oil containing a viscosity modifier outside the scope of the present invention. With this improvement in low temperature properties one is able to formulate lubricating oil compositions containing less or even no unconventional, i.e., synthetic, oils such as poly-alpha-olefins, and still meet the performance requirements set forth for crankcase lubricating oils. The unexpected ability to formulate lubricating oils according to the present invention using higher amounts of mineral oil, without a decrease in performance, results in more formulation flexibility as well as cost savings.

The dispersant properties of the products of the present invention are exemplified below in Table 4. Dispersancy was determined using the Sludge Dispersancy Test (SDT). This test measures the ability of the dispersant to suspend and move sludge chromatographically along blotter paper. When a dispersant candidate is used, oil movement along the paper results in two rings. The inner ring constitutes the sludge being transported by the dispersant, the outer ring comprises the base oil. The effectiveness of the dispersant is defined by the ratio of the diameter of the inner ring to the diameter of the outer ring. The higher the value of this ratio for a particular candidate, the better the performance of that candidate as a dispersant. In each test, six weight percent of the additives were mixed with 94% of a severely used oil from a VE engine test. The used oil, when stored overnight at 149° C. gave a dispersancy of 30 to 35% as defined by the ratio of the diameter of the inner ring of undispersed sludge on blotter paper to the diameter of the outer oil ring, times 100.

TABLE 4

Sludge Dispersancy Test

| Additive | SDT Result |
|---|---|
| Comparative Example I | 33 |
| Example I | 54 |
| Example II | 60 |

The results set forth above in Table 4 show that the products of the present invention exhibit superior dispersant properties (i.e., higher SDT results) compared to an additive outside the scope of the present invention.

Boundary lubrication occurs when fluid films are thin enough that opposing metal surfaces interact with one another. When this interaction occurs friction increases. In an engine, an increase in friction results in a decrease in fuel economy.

The boundary friction properties of fluids can be measured using a High Frequency Reciprocating Rig (HFRR). The HFRR operates by oscillating a ball across a plate in a sample cell containing 1–2 ml of sample. The frequency of oscillation, path length that the ball travels, load applied to the ball and test temperature can be controlled. By controlling these parameters, the boundary frictional properties of a fluid can be assessed.

The novel polymeric additives of the present invention, as well as comparative dispersants, were blended into SAE 5W-30 fully formulated motor oils. The boundary frictional properties of these fluids were assessed using an HFRR under the same conditions described in "Predicting Seq. VI and VIA Fuel Economy from Laboratory Bench Tests" by C. Bovington, V. Anghel and H. A. Spikes (SAE Technical Paper 961142), that is, 4N load, 1 mm path length, 20 Hz frequency. The frictional properties were measured at 130° C.

Table 5 demonstrates the improvements in boundary friction results obtained by the addition of the novel, highly grafted, multi-functional copolymers of the present invention to motor oils as compared to multi-functional copolymers containing less than 0.3 to 0.5 carboxylic groups per 1000 Mn. As mentioned above, lower boundary friction results are indicative of improved fuel economy. The multi-functional olefin copolymer viscosity modifiers used in the following examples were ethylene-propylene copolymers having a number average molecular weight of approximately 40,000 as determined by gel permeation chromatography and universal calibration standardization prepared by the methods of Example I and Comparative Example I set forth above. Table 5 sets forth the moles of carboxylic groups per 1000 Mn, the amount of ethylene-propylene copolymer viscosity index improvers and the boundary friction results. Examples 1–16 contained a commercially available low molecular weight olefin copolymer dispersant, the amount used in each Example is also indicated in the Table. Examples 9–16 additionally contained 2.0% of a conventional Mannich dispersant.

All of the tested oils were based on an SAE 5W-30 fully formulated passenger car motor oil. The oils were formulated using commercially available detergents, ZDDP, antioxidants, an antifoam agent, a pour point depressant, rust inhibitors, a viscosity index improver, a friction modifier and a diluent process oil.

TABLE 5

Boundary friction results

| Example # | Carboxylic groups/1000 Mn olefin copolymer backbone | Amount | Additional dispersant | Boundary Friction |
| --- | --- | --- | --- | --- |
| 1* | 0.16 | 6.0 | 2.0 | 0.1012 |
| 2* | 0.16 | 8.0 | 2.0 | 0.0990 |
| 3* | 0.16 | 6.0 | 5.0 | 0.1003 |
| 4* | 0.16 | 8.0 | 5.0 | 0.1011 |
| Avg. Boundary Friction/% Reduction[1] | | | | 0.1004/0% |
| 5 | 0.36 | 6.0 | 2.0 | 0.0974 |
| 6 | 0.36 | 8.0 | 2.0 | 0.0974 |
| 7 | 0.36 | 6.0 | 5.0 | 0.0969 |
| 8 | 0.36 | 8.0 | 5.0 | 0.0990 |
| Avg. Boundary Friction/% Reduction[1] | | | | 0.0977/2.7% |
| 9* | 0.16 | 6.0 | 2.0 | 0.1076 |
| 10* | 0.16 | 8.0 | 2.0 | 0.1094 |
| 11* | 0.16 | 6.0 | 5.0 | 0.1075 |
| 12* | 0.16 | 8.0 | 5.0 | 0.1084 |
| Avg. Boundary Friction/% Reduction[2] | | | | 0.1082/0% |
| 13 | 0.36 | 6.0 | 2.0 | 0.1052 |
| 14 | 0.36 | 8.0 | 2.0 | 0.1047 |
| 15 | 0.36 | 6.0 | 5.0 | 0.1050 |
| 16 | 0.36 | 8.0 | 5.0 | 0.1053 |
| Avg. Boundary Friction/% Reduction[2] | | | | 0.1050/2.9% |
| 17* | 0.16 | 8.0 | 0 | 0.1090 |
| 18 | 0.36 | 8.0 | 0 | 0.1035 |

TABLE 5-continued

Boundary friction results

| Example # | Carboxylic groups/1000 Mn olefin copolymer backbone | Amount | Additional dispersant | Boundary Friction |
| --- | --- | --- | --- | --- |
| % Reduction[3] | | | | 5.0% |

*Comparative examples
[1]Percent reduction in boundary friction compared to oil containing lower degree of graft, Examples 1–4.
[2]Percent reduction in boundary friction compared to oil containing lower degree of graft, Examples 9–12.
[3]Percent reduction in boundary friction for oil of Example 18 compared to the oil of Example 17.

It is clear from the above Table that oils containing the highly grafted, multi-functional olefin copolymers of the present invention (Examples 5–8, 13–16 and 18) exhibit improved (i.e., reduced) boundary friction, which is indicative of improved fuel economy as described above, compared to oil compositions containing olefin copolymers which have less than 0.3 to 0.75 carboxylic groups per 1000 Mn and thus are outside the scope of the present invention (Examples 1–4, 9–12 and 17).

This invention is susceptible to considerable variation in its practice. Accordingly, this invention is not limited to the specific exemplifications set forth hereinabove. Rather, this invention is within the spirit and scope of the appended claims, including the equivalents available as a matter of law.

The patentees do not intend to dedicate any disclosed embodiments to the public, and to the extent any disclosed modifications or alterations may not literally fall within the scope of the claims, they are considered to be part of the invention under the doctrine of equivalents.

We claim:

1. A highly grafted, multi-functional olefin copolymer viscosity modifier comprising the reaction product of an acylated olefin copolymer and a polyamine, wherein the acylated olefin copolymer comprises an olefin copolymer having grafted thereon from 0.3 to 0.75 carboxylic groups per 1000 number average molecular weight units of olefin copolymer and wherein the olefin copolymer has a number average molecular weight of between about 40,000 and 150,000, wherein the polyamine is selected from the group consisting of:

(a) an N-arylphenylenediamine represented by the formula:

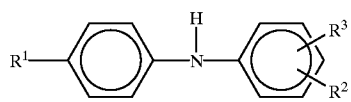

in which $R^1$ is hydrogen, —NH-aryl, —NH-arylalkyl, —NH-alkyl, or a branched or straight chain radical having from 4 to 24 carbon atoms that can be alkyl, alkenyl, alkoxyl aralkyl, alkaryl, hydroxyalkyl or aminoalkyl; $R^2$ is —NH$_2$, CH$_2$—(CH$_2$)$_n$—NH$_2$, CH$_2$-aryl-NH$_2$, in which n has a value from 1 to 10; and $R^3$ is hydrogen, alkyl, alkenyl, alkoxyl, aralkyl, alkaryl having from 4 to 24 carbon atoms;

(b) an aminothiazole from the group consisting of aminothiazole, aminobenzothiazole, aminobenzothiadiazole and aminoalkylthiazole;

(c) an aminocarbazole represented by the formula:

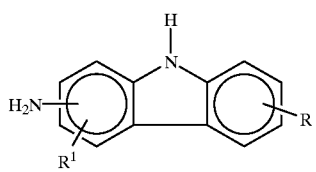

in which R and $R^1$ represent hydrogen or an alkyl, alkenyl, or alkoxy radical having from 1 to 14 carbon atoms;

(d) an aminoindole represented by the formula:

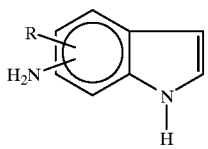

in which R represents hydrogen or an alkyl radical having from 1 to 14 carbon atoms;

(e) an aminopyrrole represented by the formula:

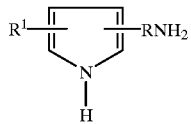

in which R is a divalent alkylene radical having 2 to 6 carbon atoms and $R^1$ is hydrogen or an alkyl radical having from 1 to 14 carbon atoms;

(f) an amino-indazolinone represented by the formula:

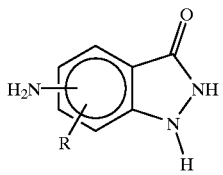

in which R is hydrogen or an alkyl radical having from 1 to 14 carbon atoms;

(g) an aminomercaptotriazole represented by the formula:

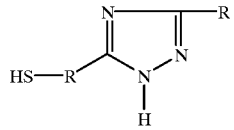

in which R can be absent or is a $C_1$–$C_{10}$ linear or branched hydrocarbon selected from the group consisting of alkyl, alkenyl, arylalkyl or aryl;

(h) an aminoperimidine represented by the formula:

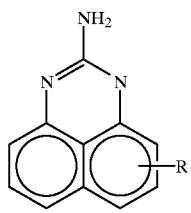

in which R represents hydrogen or an alkyl or alkoxyl radical having from 1 to 14 carbon atoms;

(i) aminoalkyl imidazoles selected from the group consisting of 1-(2-aminoethyl) imidazole and 1-(3-aminopropyl) imidazole, and (j) 4-(3-aminopropyl) morpholine.

2. The highly grafted, multi-functional olefin copolymer viscosity modifier of claim 1 wherein the olefin copolymer is a copolymer of ethylene and one or more $C_3$–$C_{23}$ alpha-olefins.

3. An oil concentrate containing, on an active ingredient basis, 20 to 90 weight percent of a carrier or diluent oil and from about 3 to 45 weight percent of the highly grafted, multi-functional olefin copolymer of claim 1.

4. The oil concentrate of claim 3 further comprising at least one additive selected from the group consisting of additional viscosity index improvers, antioxidants, corrosion inhibitors, detergents, dispersants, pour point depressants, antiwear agents, antifoamants, demulsifiers and friction modifiers.

5. A lubricating oil composition comprising a major amount of an oil of lubricating viscosity and a minor amount of the highly grafted, multi-functional olefin copolymer of claim 1.

6. The lubricating oil composition of claim 5 further comprising at least one additive selected from the group consisting of additional viscosity index improvers, antioxidants, corrosion inhibitors, detergents, dispersants, pour point depressants, antiwear agents, antifoamants, demulsifiers and friction modifiers.

7. The lubricating oil composition of claim 5 wherein the oil of lubricating viscosity is selected from the group consisting of natural oils, synthetic oils and mixtures thereof.

8. A method of improving fuel economy of a vehicle wherein said method comprises adding to and operating in the crankcase of the vehicle the lubricating oil composition of claim 5.

9. A method of improving fuel economy durability of a vehicle wherein said method comprises adding to and operating in the crankcase of the vehicle the lubricating oil composition of claim 5.

10. A method of extending lubricant drain intervals in a vehicle wherein said method comprises adding to andaerating in the crankcase of the vehicle the lubricating oil composition of claim 5.

11. A method of improving the low temperature properties of a lubricating oil, said method comprising combining an oil of lubricating viscosity and the highly grafted, multi-functional olefin copolymer of claim 1.

12. A method of lubricating an automotive engine wherein said method comprises adding to and operating in the crankcase of said automotive engine the lubricating oil composition of claim 5.

* * * * *

UNITED STATES PATENT AND TRADEMARK OFFICE
CERTIFICATE OF CORRECTION

PATENT NO. : 6,107,257
DATED : August 22, 2000
INVENTOR(S) : Joseph J. Valcho, Mark Rees, Peter Growcott, Mark Thomas Devlin and Errol J. Olivier It is certified that error appears in the above-identified patent and that said Letters Patent is hereby corrected as shown below:

Assignee should read as:
  Ethyl Corporation, Richmond, Va. and
  DSM Copolymer, Inc., Baton Rouge, La.

Signed and Sealed this

Twenty-fourth Day of April, 2001

Attest:

NICHOLAS P. GODICI

Attesting Officer   Acting Director of the United States Patent and Trademark Office